UNITED STATES PATENT OFFICE.

GUIDO BLENIO, OF NEW YORK, N. Y.

PROCESS OF FIREPROOFING WOOD.

SPECIFICATION forming part of Letters Patent No. 779,761, dated January 10, 1905.

Application filed April 22, 1903. Serial No. 153,787.

*To all whom it may concern:*

Be it known that I, GUIDO BLENIO, a citizen of the United States, residing at New York, in the county of New York and State of New York, have invented a certain new and useful Improved Process of Fireproofing Wood, of which the following is a specification, such as will enable those skilled in the art to which it appertains to make and use the same.

The object of this invention is to provide an improved process for treating wood or lumber of any size, shape, or class so as to render the same fireproof; and with this and other objects in view the invention consists in the process for the purpose specified hereinafter described and claimed.

In the practice of my invention I provide a tank or casing, preferably air-tight, or approximately so, and with which is connected a steam-supply pipe by means of which the said tank may be heated, or the said tank may be heated in any desired manner, the object of heating the tank being to raise and maintain the temperature of the solution hereinafter described to about the boiling-point.

I first place a predetermined quantity of water in the tank and add thereto phosphate of ammonia in the proportion of one pound to each gallon of water contained in the tank, and this solution or mixture is raised to the boiling-point by steam, direct heat, or in any suitable way. I then take a quantity of starch in the proportion of two ounces of starch to each gallon of water contained in the tank and dissolve the same in as small a quantity of water as possible. I then put this solution in boiling water, and when the starch is thoroughly cooked I place the same in the solution of phosphate of ammonia and thoroughly agitate the whole, so as to keep the starch from forming a lump and at the same time keeping the combined solution at, or about at, the boiling-point. When the starch has had sufficient time to become thoroughly cooked and the solution is thoroughly mixed, I place the lumber to be rendered fireproof in the said tank and solution and close the tank and make it substantially air-tight, at the same time keeping the temperature of the solution at, or about at, the boiling-point, this condition being continued as long as the lumber is allowed to remain in the tank, which depends upon the hardness or quality of the wood.

As will be readily understood, the process of impregnating woods of different kinds and classes so as to render them fireproof takes greater or less time, according as the wood is of close or open grain, and when wood of loose grain or soft wood—such as pine, hemlock, or other woods of this class—are to be rendered fireproof by means of my process I allow the same to remain in the boiling solution for from twelve to twenty-four hours, the period of time depending on the grain of the wood and the texture there. After the lumber contained in the tank has been thoroughly impregnated or soaked with the solution it is withdrawn and permitted to dry, and the object of using starch in the solution is to provide a medium for retaining the phosphate of ammonia in the grain of the wood, and changes in climate or weather will have no effect upon lumber treated in this manner, and such lumber will be fireproof under all conditions and will only char when subjected to a high degree of heat.

When pine or similar woods, which usually contain a large amount of fat or resinous matter, are to be rendered fireproof, I first steam the wood before placing the same in the tank, the object being to remove the fat or resinous substances, at least to an extent, in order that the solution may operate more readily on the wood, and after this the wood is dried and then placed in the tank.

It will of course be understood that boards, moldings, carvings, or other shapes and forms of wood may be treated in this manner after having been fitted for use in buildings, and by treating at this time the possibility of any portion of the wood not having been impregnated or soaked in the solution, and thus made fireproof, is obviated, and it will also be understood that after the wood has been steamed in the manner described it is dried and subjected to the process hereinbefore set out.

Having fully described my invention, what I claim as new, and desire to secure by Letters Patent, is—

The herein-described process of treating wood and rendering the same fireproof, said process consisting in first steaming the wood, then drying the same, then soaking the wood in a hot solution of phosphate of ammonia, starch and water, substantially as shown and described.

In testimony that I claim the foregoing as my invention I have signed my name, in presence of the subscribing witnesses, this 17th day of April, 1903.

GUIDO BLENIO.

Witnesses:
F. A. STEWART,
J. C. LARSEN.